(12) United States Patent
Azimi

(10) Patent No.: US 7,389,374 B1
(45) Date of Patent: *Jun. 17, 2008

(54) HIGH LATENCY INTERFACE BETWEEN HARDWARE COMPONENTS

(75) Inventor: Saeed Azimi, Union City, CA (US)

(73) Assignee: Marvell International Ltd., Hamilton (BM)

( * ) Notice: Subject to any disclaimer, the term of this patent is extended or adjusted under 35 U.S.C. 154(b) by 99 days.

This patent is subject to a terminal disclaimer.

(21) Appl. No.: 11/311,848

(22) Filed: Dec. 19, 2005

Related U.S. Application Data

(63) Continuation of application No. 10/962,321, filed on Oct. 12, 2004, now Pat. No. 7,171,507, which is a continuation of application No. 09/661,912, filed on Sep. 14, 2000, now Pat. No. 6,871,251.

(60) Provisional application No. 60/205,594, filed on May 17, 2000.

(51) Int. Cl.
*G06F 13/14* (2006.01)

(52) U.S. Cl. .................. 710/305; 710/14; 710/60

(58) Field of Classification Search ............ None
See application file for complete search history.

(56) References Cited

U.S. PATENT DOCUMENTS

| | | | |
|---|---|---|---|
| 3,571,806 A | 3/1971 | Makie et al. |
| 4,607,348 A | 8/1986 | Sheth |
| 4,779,196 A | 10/1988 | Manga |
| 5,133,060 A | 7/1992 | Weber et al. |
| 5,218,686 A | 6/1993 | Thayer |
| 5,228,129 A | 7/1993 | Bryant et al. |
| 5,235,683 A | 8/1993 | Dahlerud |
| 5,264,958 A | 11/1993 | Johnson |
| 5,274,772 A | 12/1993 | Dunn et al. |
| 5,339,395 A | 8/1994 | Pickett et al. |
| 5,444,857 A | 8/1995 | Rowland |
| 5,544,334 A | 8/1996 | Noll |
| 5,555,380 A | 9/1996 | Suzuki |
| 5,564,027 A | 10/1996 | Bui et al. |
| 5,568,470 A | 10/1996 | Ben-Nun et al. |
| 5,592,632 A | 1/1997 | Leung et al. |
| 5,613,136 A | 3/1997 | Casavant et al. |
| 5,652,848 A | 7/1997 | Bui et al. |
| 5,675,829 A | 10/1997 | Oskouy et al. |
| 5,694,614 A | 12/1997 | Bennett |
| 5,758,191 A | 5/1998 | Kasebayashi et al. |
| 5,802,554 A | 9/1998 | Caceres et al. |

(Continued)

OTHER PUBLICATIONS

Hans-Peter Messmer, "The Indispensable PC Hardware Book", 1995, Addison-Wesley Publishers, Ltd., 2nd Ed. pp. 1072-1077.

(Continued)

*Primary Examiner*—Khanh Dang

(57) ABSTRACT

A computer program is stored on a computer-readable medium and executed by a processor and performs a method of transmitting and receiving signals between a hard disk controller and a read channel. The computer program comprises transmitting a data gate signal; transmitting or receiving data under control of the data gate signal; transmitting a media gate signal; and transmitting mode selection information under control of the media gate signal, wherein said data gate signal controls the transfer of data between the hard disk controller and the read channel and wherein data is transferred between a storage media and the read channel in accordance with the media gate signal.

21 Claims, 9 Drawing Sheets

U.S. PATENT DOCUMENTS

| | | |
|---|---|---|
| 5,838,934 A | 11/1998 | Boutaud et al. |
| 5,920,709 A | 7/1999 | Hartung et al. |
| 6,009,549 A | 12/1999 | Bliss et al. |
| 6,088,754 A | 7/2000 | Chapman |
| 6,272,589 B1 | 8/2001 | Aoki |
| 6,301,633 B1 | 10/2001 | Chapman |
| 6,393,506 B1 | 5/2002 | Kenny |
| 6,407,913 B1 | 6/2002 | Peachey et al. |
| 6,513,105 B1 | 1/2003 | Pontius |
| 6,519,667 B2 | 2/2003 | Kondo et al. |
| 6,539,439 B1 | 3/2003 | Nguyen et al. |
| 6,636,906 B1 | 10/2003 | Sharma et al. |
| 6,757,698 B2 | 6/2004 | McBride et al. |
| 6,871,251 B1 | 3/2005 | Azimi |

OTHER PUBLICATIONS

Lee, ChangHwan, "IEEE Standard 1394 Serila Bus", 1998, Pusan National University, 8 pages.

T. Chelcea, "A Low-Latency FIFO for Mixed-Clock Systems", Department of Computer Science, Columbia University, 45 pages.

T. Chelcea, "A Low-Latency FIFO for Mixed-Clock Systems", Department of Computer Science, Columbia University, 45 pages, unknown date.

HIGH LATENCY INTERFACE BETWEEN HARDWARE COMPONENTS

CROSS-REFERENCE TO RELATED APPLICATIONS

This application is a continuation of U.S. patent application Ser. No. 10/962,321 entitled "High Latency Interface Between Hardware Components," filed on Oct. 12, 2004, which is a continuation of, and claims priority under 35 U.S.C. § 120 on, U.S. application Ser. No. 09/661,912, which issued into U.S. Pat. No. 6,871,251, entitled "High Latency Interface Between Hardware Components," filed Sep. 14, 2000, which further claims priority on 35 U.S.C. § 119(e) on U.S. Provisional Application No. 60/205,594, entitled "High Latency RDC/HDC Interface," filed May 17, 2000, the entire contents of each of which are hereby incorporated by reference herein.

FIELD

The present disclosure relates to a versatile, latency-independent interface between hardware components, such as between a read/write (R/W) channel or read channel (RDC) and a hard disk controller (HDC). Such an interface is flexible enough to support high read and write latencies of greater than one sector, a split sector format, and a second sector mark.

BACKGROUND

The statements in this section merely provide background information related to the present disclosure and may not constitute prior art.

As is shown in FIG. 1, a typical disk drive system includes a hard disk controller (HDC) 12 that interfaces with a R/W channel or RDC 14 which is in communication with a disk 16. Data transfer between the HDC and the R/W channel is synchronized by read gate (RGATE) and write gate (WGATE) control signals. In a read operation, R/W channel 14 processes an incoming analog signal from disk 16 and transfers the data to HDC 12. In a write operation, data is transferred from the HDC to the R/W channel to be written to the disk. Latency refers to the time or byte delay that data remains in the R/W channel. Some disk drive systems have latencies of about 20 bytes which, depending on the particular system, amounts to a time delay of between about 800 ns and 5 ms.

Technology such as iterative turbo coding, which is being introduced into modern disk drive systems, requires more processing before the data is available, which, in turn, requires R/W channels or RDCs with higher latencies. One problem is that the interface used in the shorter latency systems is not capable of supporting the higher latencies. Accordingly, a new interface is needed that supports higher latency R/W channel or RDC designs.

SUMMARY

It is therefore an object of the present invention to provide an interface between hardware components, such as between an HDC and a R/W channel or RDC, that supports relatively high read and write latencies.

It is another object of this invention to provide an interface signaling protocol which is flexible enough to support high read and write latencies of greater than one sector, and which supports a split sector format and multiple sector marks.

According to one aspect of the invention, a latency-independent interface between first and second hardware components is provided. Such a latency-independent interface comprises a data gate circuit that transmits a data gate signal; a data circuit that transmits or receives data under the control of the data gate signal; a media gate circuit that transmits a media gate signal; a mode selection circuit that transmits mode selection information under the control of the media gate signal; and a buffer attention circuit that receives a buffer attention signal.

In another aspect, the invention involves a latency-independent interface between first and second hardware components, which comprises a data gate circuit that receives a data gate signal; a data circuit that transmits or receives data under the control of the data gate signal; a media gate circuit that receives a media gate signal; a mode selection circuit that receives mode selection information under the control of the media gate signal; and a buffer attention circuit that transmits a buffer attention signal.

In yet another aspect of the invention, a latency-independent interface between first and second hardware components is provided. Such a latency-independent interface comprises a first data gate circuit that transmits a data gate signal; a first data circuit that transmits or receives data under the control of the data gate signal; a first media gate circuit that transmits a media gate signal; a first mode selection circuit that transmits mode selection information under the control of the media gate signal; a first buffer attention circuit that receives a buffer attention signal; a second data gate circuit that receives the data gate signal; a second data circuit that transmits or receives data under the control of the data gate signal; a second media gate circuit that receives the media gate signal; a second mode selection circuit that receives mode selection information under the control of the media gate signal; and a second buffer attention circuit that transmits a buffer attention signal.

Preferably, the mode selection information comprises tag information and control information. More preferably, the tag information comprises a tag command that identifies a location of associated data, and the control information comprises commands that indicate whether associated data is continued from a previous location or from a new location, a reset command, and size information including a size command that indicates size of associated data.

In other aspects, the invention embraces methods of transmitting and receiving signals between first and second hardware components corresponding to each of the interface devices set forth above. Such methods and/or steps thereof may be implemented by a program of instructions (e.g., software) embodied on a device-readable medium, such as a magnetic tape or disk, or optical medium that may be used to store such instructions. More broadly, the device-readable medium may include signals transmitted over network paths, infrared signals, as well as other signals throughout the electromagnetic spectrum that may be used to convey instructions. The instructions may be executed by a computer or other processor-controlled device. The program of instructions may also be in the form of hardware, or combination of software and hardware.

Still other aspects of the invention include interface protocols between at least two hardware components corresponding to each of the interface devices set forth above.

Other objects and attainments together with a fuller understanding of the invention will become apparent and appreciated by referring to the following description and claims taken in conjunction with the accompanying drawings.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 4A:
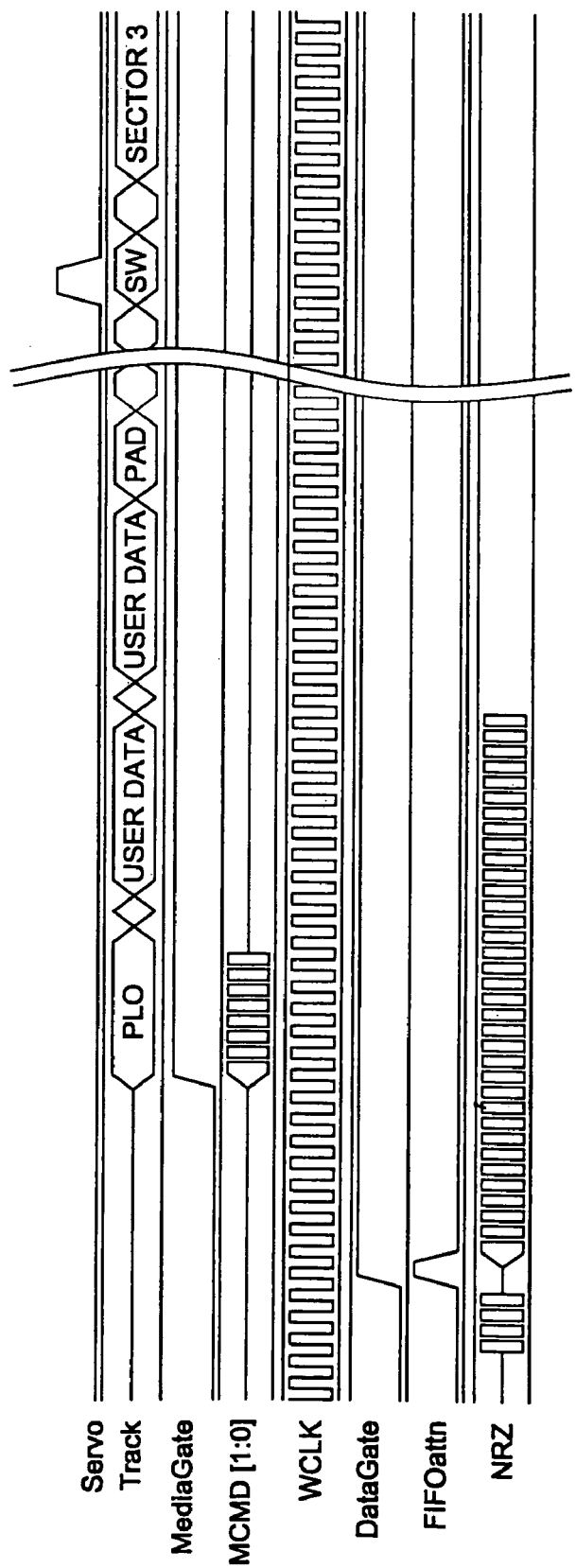

FIGS. 4(a), (b) and (c) are timing diagrams for high latency write operation, in accordance with embodiments of the invention.

Figure 5A:
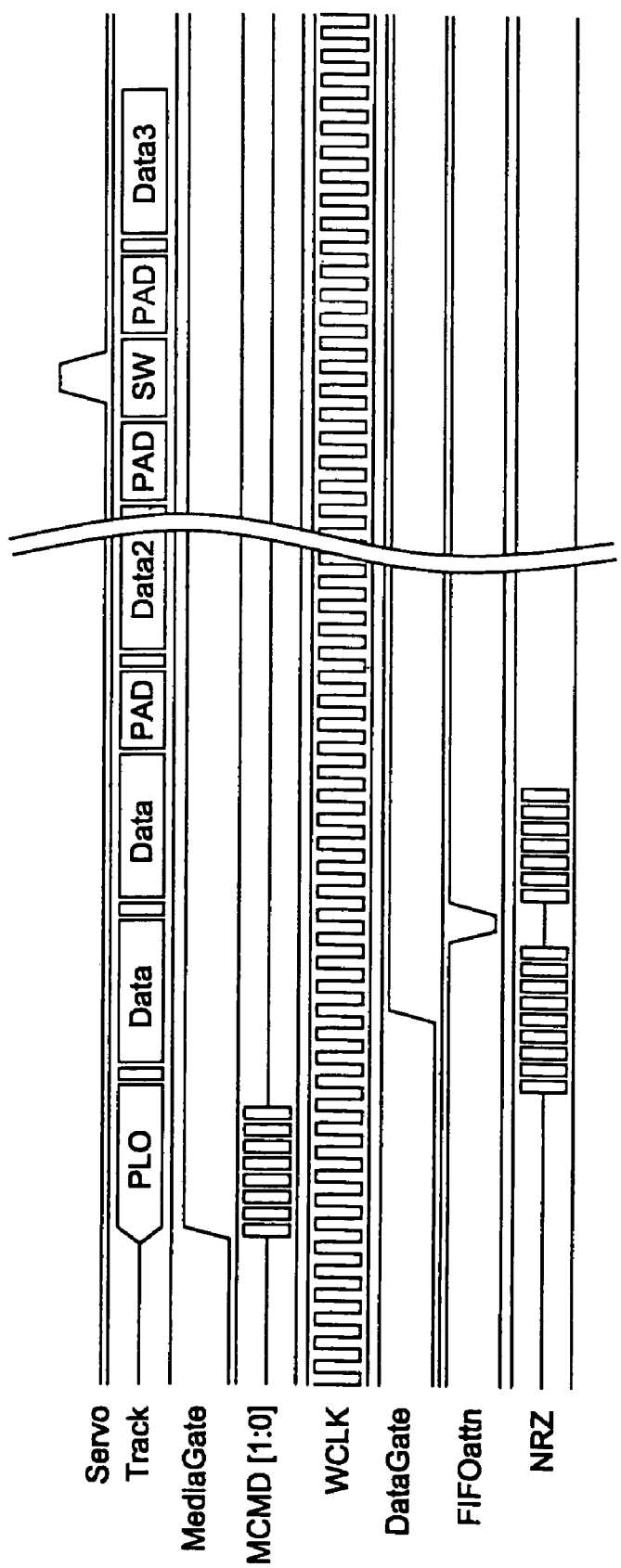

FIGS. 5(a), (b) and (c) are timing diagrams for high latency read operation, in accordance with embodiments of the invention.

DETAILED DESCRIPTION

Figure 1:
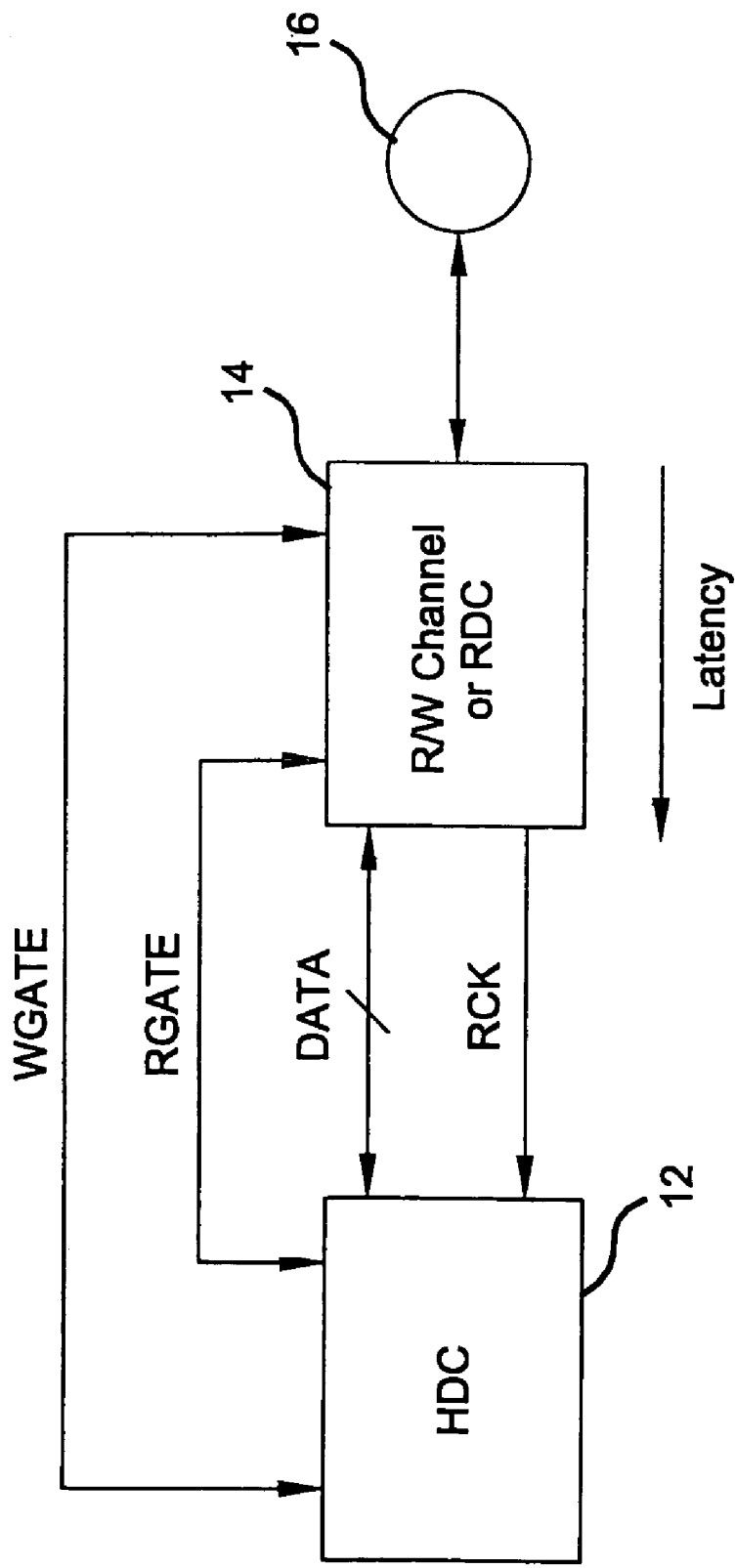
FIG. 1 is a block diagram of a conventional RDC/HDC interface.
Figure 2:
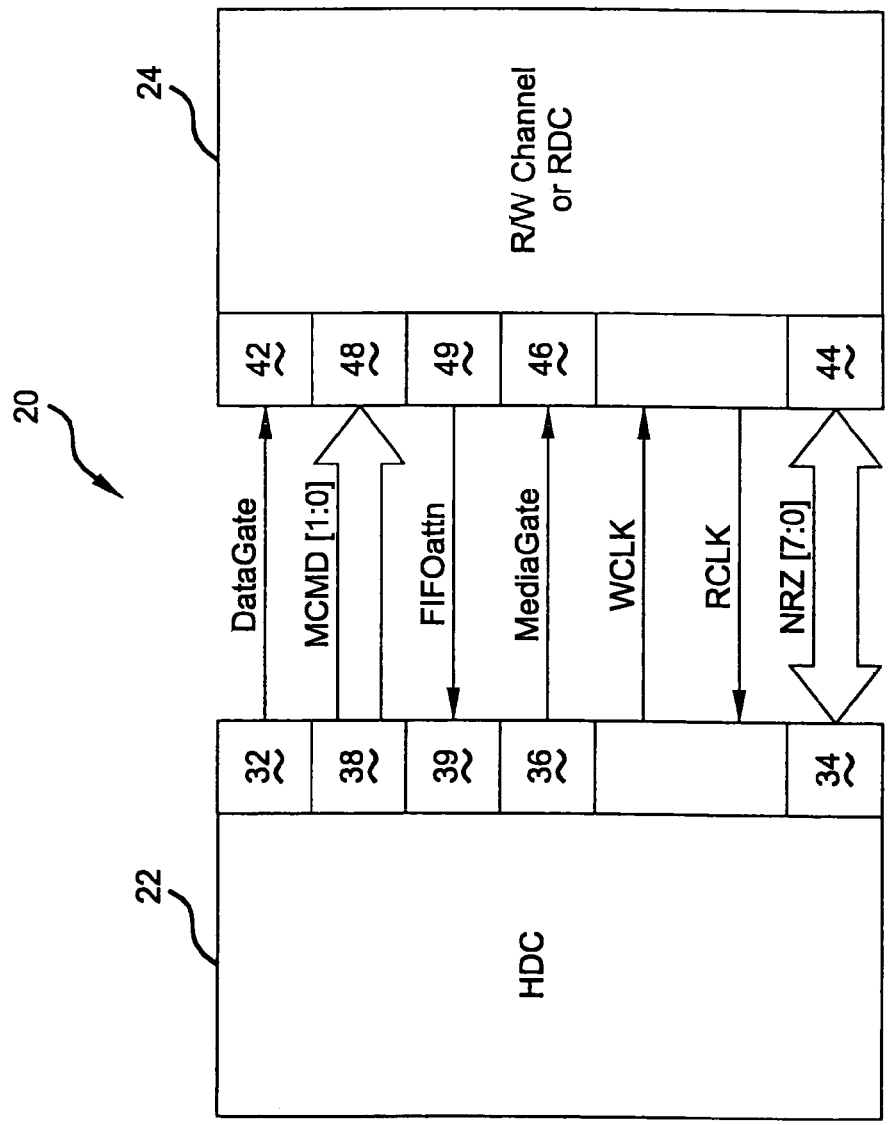
FIG. 2 is a block diagram of an interface between two hardware components, such as an HDC and an RDC or R/W channel, in accordance with embodiments of the invention.

Referring to FIG. 2, a block diagram of an interface 20 between a first hardware component 22 and a second hardware component 24, in accordance with embodiments of the invention, is illustrated. In a preferred embodiment, first hardware component 22 is a hard disk controller (HDC) and second hardware component 14 is a read/write (R/W) channel or read channel (RDC), although the invention is not so limited. Rather, interface 20 of the present invention may be employed in connection with other suitable functional hardware components between which data is transferred.

In accordance with the invention, interface 20 employs a new signaling protocol which decouples the timing of the conventional read and write gate control signals with the transfer of data by replacing those signals with a MediaGate signal, as described below. The interface supports read and write latencies of more than a sector long. The interface also supports split sector format (i.e., noncontiguous sectors of data) and multiple sector marks.

In the illustrated embodiment, the interface 20 of the present invention employs a read clock signal (RCLK) sourced from the R/W channel and output during read operations, and a write clock signal (WCLK) sourced from the HDC and output during write operations.

In accordance with the invention, interface 20 further includes two buses and two respectively associated control signals. A data gate signal (DataGate), sourced from the HDC, is synchronous with, and controls, NRZ data transfer between the RAN channel and the HDC via a bi-directional data bus. In one embodiment, the data bus (NRZ [7:0]) is byte-wide, with bits 0-7 represented by NRZ [0]-NRZ [7]. However, the data bus of the present invention may accommodate more or less than eight bits. The data signal may also include a parity bit, which in a byte-wide signal may be represented by NRZ [8].

A media gate signal (MediaGate) is provided which, as previously noted, replaces the conventional read and write gate control signals. MediaGate is sourced from the HDC and indicates the location of particular sectors on the track media. MediaGate is used to control data transfer between the disk and the R/W channel and is associated with a mode selection bus MCMD [1:0] that provides mode selection information to the R/W channel. Such mode selection information includes tag, control and size information. More specifically, such mode selection information includes commands such as "Tag ID" that identifies the sector in which the associated data is contained, "Cont" or "New" which indicates that the data is continued from the previous sector or from a new sector and "Reset" which resets the data transfer operation, and "Size" which indicates the byte size of the data of bytes.

Another interface signal, FIFOattn, is sourced from the R/W channel and indicates channel FIFO status during write and read operations. When the channel FIFO becomes full during a write operation, FIFOattn is asserted (i.e., becomes high) to indicate that the channel FIFO is full and that no more data can be transferred from HDC at this time. In that situation, the HDC must pause and resume data transfer only after FIFOattn is de-asserted. During read operation, a high FIFOattn indicates that the channel FIFO is ready for data from the HDC. On the other hand, a low FIFOattn indicates that no data can be transferred, in which case the HDC must pause data transfer until FIFOattn is asserted.

Each of the HDC 22 and the R/W channel 24 include appropriate circuitry for transmitting and receiving the various signals, data and mode selection information between the two hardware components. For example, HDC 22 includes a data gate circuit 32 that transmits DataGate, and a data circuit 34 that transmits and receives data on the data bus under the control of DataGate. HDC 22 also includes a media gate circuit 36 that transmits MediaGate, and a mode selection circuit 38 that transmits mode selection information under the control of MediaGate. A buffer attention circuit 39 is provided for receiving FIFOattn. R/W channel 24 comprises corresponding circuit components, including a data gate circuit 42 that receives DataGate, and a data circuit 44 that transmits and receives data on the data bus under the control of DataGate. R/W channel 24 also includes a media gate circuit 46 that receives MediaGate, and a mode selection circuit 48 that receives mode selection information under the control of MediaGate. A buffer attention circuit 49 is provided for transmitting FIFOattn. Signal and data transmitting and receiving circuits are generally known, and based on the teachings provided herein, one skilled in the art would be able to construct and implement transmitting and receiving circuits to carry out the specific signaling protocol described herein.

A parity signal (not shown), sourced from the R/W channel, may be used during write mode as a parity error feedback for write data input. During read mode, the parity signal can be used to output a Thermal Asperity (TA) detector's flag.

Figure 3:
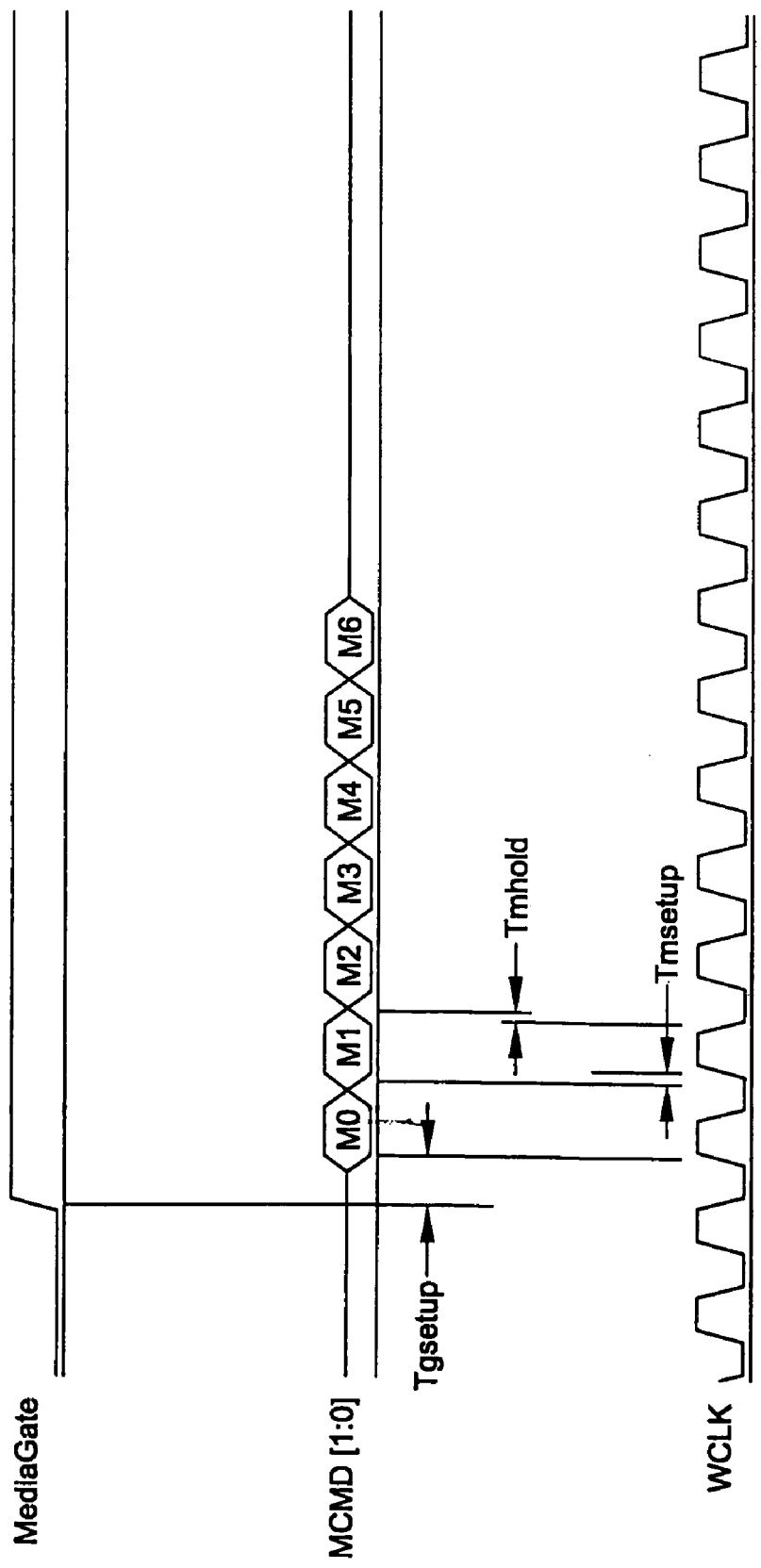
FIG. 3 is a timing diagram for write/read operations, in accordance with embodiments of the invention.

FIG. 3 is an exemplary timing diagram for write/read operations. Timing of the control signal MediaGate and its associated bus MCMD [1:0] are illustrated, along with WCLK.

In write/read operations, according to one embodiment, the R/W channel samples MCMD [1:0], received from the HDC, eight times in accordance with the WCLK/RCLK immediately after MediaGate is asserted. There are 2 bits/sample making a total of 16 bits. The R/W channel decodes the 16 bits of mode selection commands from the most significant bit to the least significant bit as set forth in Table 1 below.

TABLE 1

| Bits | Command | Description |
| --- | --- | --- |
| MCMD [15:13] | Tag | 3 bits of Tag information (0-7) |
| MCMD [12] | Reset | 1 = Reset |
| | | Used for Read only |
| MCMD [11] | New/Cont | 0 = new sector |
| | | 1 = continue previous sector |
| MCMD [10:0] | Size | Size in resolution of 4 bytes up to a maximum size of 8 Kbytes |

In addition to the commands listed in Table 1, commands indicating various error conditions may also be employed.

In write/read operations, the assertion of DataGate is synchronous with NRZ data transfer. The 5 lower bits of the conventional Sync byte are replaced with data command information (DCMD) on the data bus NRZ [7:0]. The R/W channel decodes the lower 5 bits of DCMD as set forth below in Table 2.

TABLE 2

| Bits | DCMD | Description |
| --- | --- | --- |
| DCMD [4:2] | Tag | 3 bits of Tag information (0-7) |
| DCMD [1] | Reset | 1 = Reset |
| | | Used for Write only |
| DCMD [0] | New/Cont | 0 = new sector |
| | | 1 = continue previous sector |

In addition to the commands listed in Table 2, a size command may also be used.

Regarding the operation of FIFOattn, for write operations, FIFOattn will be asserted by the R/W channel just before its FIFO becomes full. In particular, after FIFOattn is asserted (i.e., goes high), the R/W channel FIFO is able to accept one more byte from the HDC. After that, while FIFOattn remains high, the HDC assumes a pause state and does not resume data transfer until FIFOattn is de-asserted again.

For read operations, FIFOattn will be asserted by the R/W channel if its FIFO data is available to be transferred to the HDC. After FIFOattn is de-asserted (i.e., goes from high to low), the HDC can read one more byte of data. After that, while FIFOattn remains low indicating the R/W channel FIFO is not ready, the HDC assumes a pause state. Data transfer from the R/W channel to the HDC is not resumed until FIFOattn is asserted again.

Write Operation

A write operation is initiated by the HDC by asserting DataGate which is synchronous with the data transfer on NRZ [7:0]. The NRZ data is latched by the R/W channel on the rising edge of WCLK, as shown in FIG. 4. HDC provides additional mode selection commands (DCMD) using the lower 5 bits of the sync byte. The values of DCMD are set forth above in Table 2.

Figure 4B:
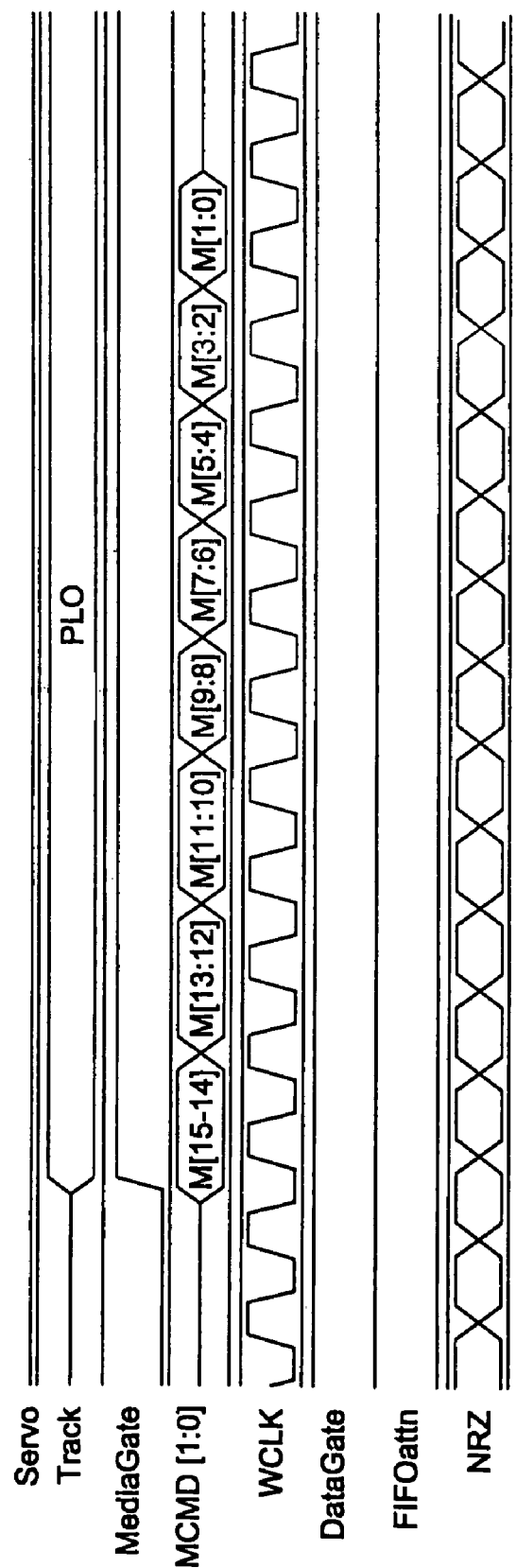
Figure 4C:
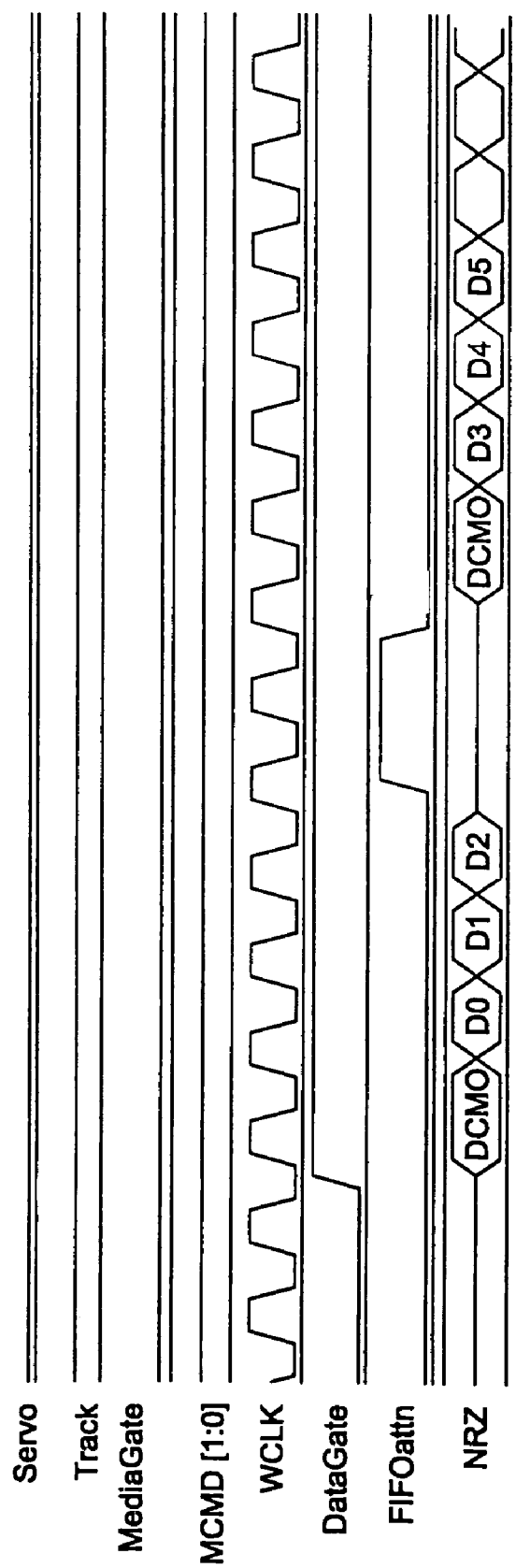

FIG. 4(a) illustrates the overall timing of signals including the interface signals in the write operation. The servo signal indicates where positioning information is located to maintain the center of the disk sensing element over a center of a track on the disk 16. The data is written on a specific track of the disk, and the track signal contains that information in a specific format required by the RDC. FIG. 4(b) is a "blow up" of that portion of FIG. 4(a) showing MCMD information transfer which occurs over the "PLO" field which is the period that RDC acquires phase lock to the incoming track signal. FIG. 4(c) is a "blow up" of that portion of FIG. 4(a) illustrating DCMD transfer which occurs over the beginning of the data transfer between HDC and RDC indicated by the rising edge of the DataGate signal.

In the case where the R/W channel FIFO is becoming full, with the high latency R/W channel of the present invention, FIFOattn will be asserted by the R/W channel when its FIFO has only one more location for data before it reaches an overflow condition. After detecting FIFOattn, HDC enters a pause state in which data transfer is temporarily halted. Data transfer is resumed only after FIFOattn is de-asserted. When data transfer is resumed the HDC also provides appropriate mode selection commands (DCMD).

The HDC provides additional information to the R/W channel on MediaGate, MCMD0 and MCMD1. After receiving the size information and matching the Tag IDs (DCMD and MCMD tag fields), the R/W channel can write data to the medium (e.g., the disk). The "New" command is issued for the beginning of a sector of data, while "Cont" is issued for the remaining data of a split sector. The HDC may use the "Reset" command to reset/reinitialize the R/W channel FIFO pointer.

Read Operation

Figure 5B:
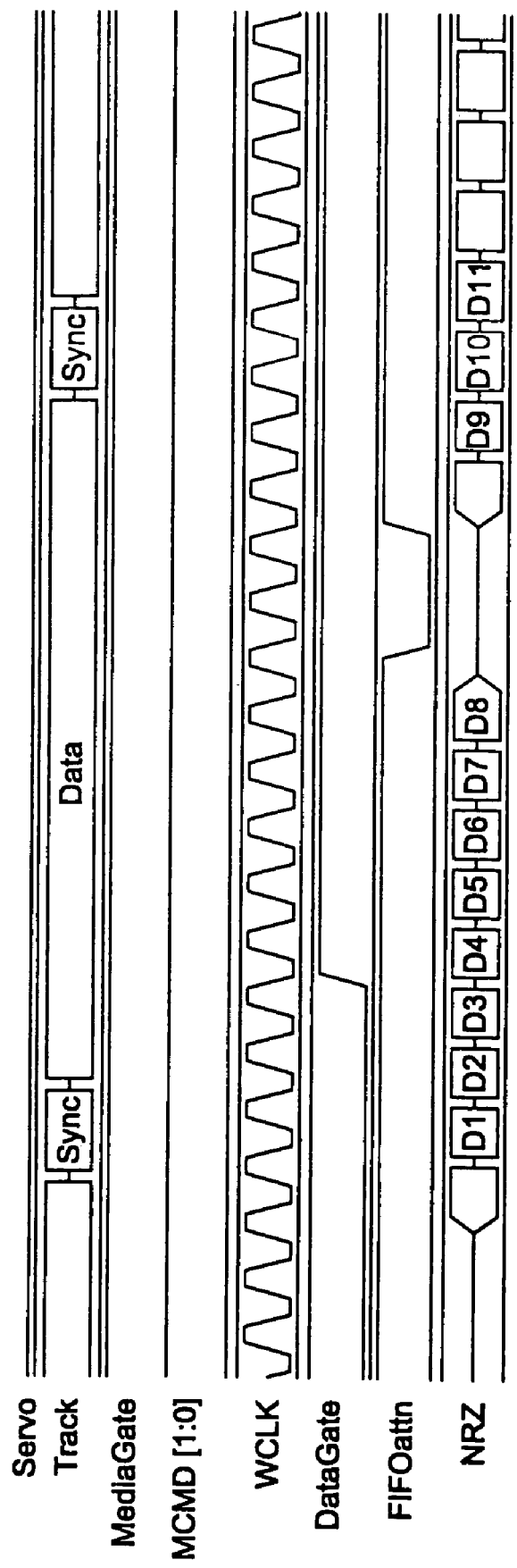
Figure 5C:
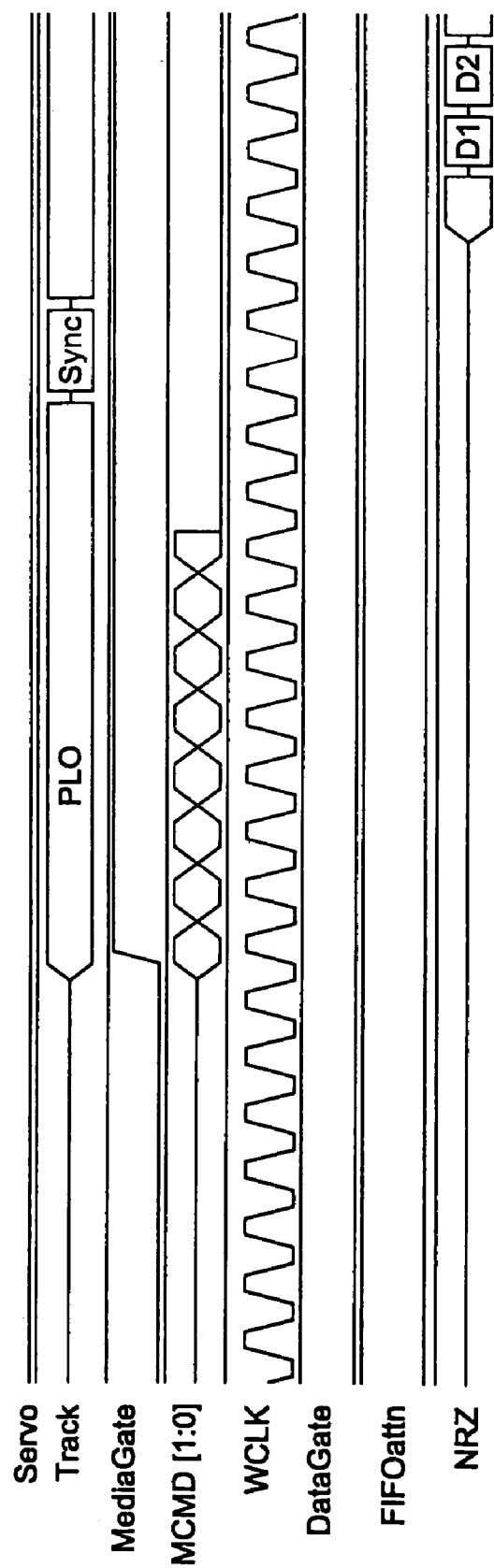

Exemplary timing diagrams of various signals employed in high latency read operation is illustrated in FIG. 5. FIG. 5(a) illustrates the overall timing of signals including the interface signals in the read operation. The servo signal and track signal function as explained above. FIG. 5(b) is a "blow up" of that portion of FIG. 5(a) showing MCMD information transfer which occurs over the "PLO" field which is the period that RDC acquires phase lock to the incoming track signal. FIG. 5(c) is a "blow up" of that portion of FIG. 5(a) illustrating DCMD transfer which occurs over the beginning of the data transfer between HDC and RDC indicated by the rising edge of the DataGate signal.

The R/W channel can read data from the medium, after receiving the size information and the "New" or "Cont" command. With the high latency R/W channel of the present invention, FIFOattn will be asserted by the R/W channel if its FIFO is ready to transfer data. The HDC starts receiving data after detecting FIFOattn in the asserted state. The R/W channel de-asserts FIFOattn one byte of data before an underrun condition occurs. After FIFOattn is de-asserted, the HDC enters a pause state in which data is not received. The R/W channel provides DCMD information when asserting FIFOattn again to allow data transfer to continue.

In transferring data from the RNL channel to the HDC with DCMD, the NRZ data is latched by the HDC on each rising edge of RCLK. The R/W channel provides an additional byte of mode information (DCMD) before regular data transfer. The DCMD values are set forth in Table 2 above. The R/W channel may use the Reset command to inform the HDC to reset/re-initialize the memory.

The interface signaling protocol of the present invention may be controlled by a processor operating in accordance with a program of instructions which may be in the form of software. Alternatively, the program of instructions may be implemented with discrete logic components, application specific integrated circuits (ASICs), digital signal processors, or the like. Based on the teachings herein, one skilled in the art would be able to implement an appropriate instruction program in either software or hardware for carrying out the interface signaling protocol of the present invention.

It should be readily apparent from the foregoing description that the interface of the present invention supports high read and write latencies of greater than one sector. In particular, with the additional Tag ID and control bits, interface 20 can support an R/W channel latency more than one sector long. The Tag ID advantageously allows the transfer of multiple noncontiguous sectors or out-of-order sectors. Moreover, the interface is also capable of supporting a split sector format and a multiple sector mark.

While embodiments of the invention have been described, it will be apparent to those skilled in the art in light of the foregoing description that many further alternatives, modifications and variations are possible. The invention described herein is intended to embrace all such alternatives, modifications and variations as may fall within the spirit and scope of the appended claims.

What is claimed is:

1. A computer program stored on a computer-readable medium and executed by a processor for performing a method of transmitting and receiving signals between a hard disk controller and a read channel, the program comprising:
   transmitting a data gate signal;
   transmitting or receiving data under control of the data gate signal;
   transmitting a media gate signal; and
   transmitting mode selection information under control of the media gate signal, wherein said data gate signal controls the transfer of data between the hard disk controller and the read channel and wherein data is transferred between a storage media and the read channel in accordance with the media gate signal.

2. The program of claim 1, wherein the mode selection information comprises tag information and control information.

3. The program of claim 2, wherein the tag information comprises a tag command that identifies a location of associated data, and the control information comprises commands that indicate whether associated data is continued from a previous location or from a new location.

4. The program of claim 3, wherein the control information further comprises a reset command.

5. The program of claim 3, wherein the control information further comprises size information comprising a size command that indicates size of associated data.

6. A computer program stored on a computer-readable medium and executed by a processor for performing a method of transmitting and receiving signals between a hard disk controller and a read channel, the program comprising:
   receiving a data gate signal;
   transmitting or receiving data under control of the data gate signal;
   receiving a media gate signal; and
   receiving mode selection information under control of the media gate signal, wherein said data gate signal controls the transfer of data between the hard disk controller and the read channel and wherein data is transferred between a storage media and the read channel in accordance with the media gate signal.

7. The program of claim 6, wherein the mode selection information comprises tag information and control information.

8. The program of claim 7, wherein the tag information comprises a tag command that identifies a location of associated data, and the control information comprises commands that indicate whether associated data is continued from a previous location or from a new location.

9. The program of claim 8, wherein the control information further comprises a reset command.

10. The program of claim 8, wherein the control information further comprises size information comprising a size command that indicates size of associated data.

11. A computer program stored on a computer-readable medium and executed by a processor for performing a method of transmitting and receiving signals between a hard disk controller and a read channel, the program comprising:
    transmitting and receiving a data gate signal;
    transmitting or receiving data under control of the data gate signal;
    transmitting and receiving a media gate signal; and
    transmitting and receiving mode selection information under control of the media gate signal, wherein said data gate signal controls the transfer of data between the hard disk controller and the read channel and wherein data is transferred between a storage media and the read channel in accordance with the media gate signal.

12. The program of claim 11, wherein the mode selection information comprises tag information and control information.

13. The program of claim 12, wherein the tag information comprises a tag command that identifies a location of associated data, and the control information comprises commands that indicate whether associated data is continued from a previous location or from a new location.

14. The program of claim 13, wherein the control information further comprises a reset command.

15. The program of claim 13, wherein the control information further comprises size information comprising a size command that indicates size of associated data.

16. The program of claim 1, further comprising receiving a buffer attention signal.

17. The program of claim 6, further comprising transmitting a buffer attention signal.

18. The program of claim 11, further comprising transmitting and receiving a buffer attention signal.

19. A device readable medium, comprising:
    a computer program executed by a processor for performing a method of transmitting and receiving signals between a hard disk controller and a read channel, the program comprising:
    transmitting a data gate signal;
    transmitting or receiving data under control of the data gate signal;
    transmitting a media gate signal; and
    transmitting mode selection information under control of the media gate signal, wherein said data gate signal controls the transfer of data between the hard disk controller and the read channel and wherein data is transferred between a storage media and the read channel in accordance with the media gate signal.

20. A device readable medium, comprising:
    a computer program executed by a processor for performing a method of transmitting and receiving signals between a hard disk controller and a read channel, the program comprising:
    receiving a data gate signal;
    transmitting or receiving data under control of the data gate signal;
    receiving a media gate signal; and
    receiving mode selection information under control of the media gate signal, wherein said data gate signal controls the transfer of data between the hard disk controller and the read channel and wherein data is transferred between a storage media and the read channel in accordance with the media gate signal.

21. A device readable medium, comprising:
a computer program executed by a processor for performing a method of transmitting and receiving signals between a hard disk controller and a read channel, the program comprising:
transmitting and receiving a data gate signal;
transmitting or receiving data under control of the data gate signal;
transmitting and receiving a media gate signal; and
transmitting and receiving mode selection information under control of the media gate signal, wherein said data gate signal controls the transfer of data between the hard disk controller and the read channel and wherein data is transferred between a storage media and the read channel in accordance with the media gate signal.

* * * * *

UNITED STATES PATENT AND TRADEMARK OFFICE
CERTIFICATE OF CORRECTION

PATENT NO.         : 7,389,374 B1
APPLICATION NO. : 11/311848
DATED                 : June 17, 2008
INVENTOR(S)       : Saeed Azimi It is certified that error appears in the above-identified patent and that said Letters Patent is hereby corrected as shown below:

Column 6, Line 48          Delete "RNL" and insert -- R/W --

Signed and Sealed this

Sixteenth Day of September, 2008

JON W. DUDAS
*Director of the United States Patent and Trademark Office*